United States Patent [19]
Ueda et al.

[11] Patent Number: 6,115,555
[45] Date of Patent: Sep. 5, 2000

[54] IMAGE SHOOTING APPARATUS

[75] Inventors: Hirosih Ueda, Habikino; Kazumi Sugitani, Sakai, both of Japan

[73] Assignee: Minolta Co., Ltd., Osaka, Japan

[21] Appl. No.: 09/118,274

[22] Filed: Jul. 17, 1998

[30] Foreign Application Priority Data

Jul. 18, 1997 [JP] Japan .................................... 9-194089
Jul. 18, 1997 [JP] Japan .................................... 9-194091
Jul. 18, 1997 [JP] Japan .................................... 9-194094

[51] Int. Cl.$^7$ .................................................. G03B 13/36
[52] U.S. Cl. ........................................... 396/109; 396/121
[58] Field of Search ................................. 396/109, 121, 396/122, 123; 356/3.1, 3.11

[56] References Cited

U.S. PATENT DOCUMENTS

| | | | |
|---|---|---|---|
| 4,582,424 | 4/1986 | Kawabata | 396/109 X |
| 4,843,415 | 6/1989 | Matsui et al. | 356/3.05 X |
| 4,954,861 | 9/1990 | Nagaoka et al. | 396/106 |
| 4,962,400 | 10/1990 | Otani et al. | 396/106 |
| 5,191,384 | 3/1993 | Nakanishi et al. | 396/106 X |

*Primary Examiner*—W. B. Perkey
*Attorney, Agent, or Firm*—Burns, Doane, Swecker & Mathis, LLP

[57] ABSTRACT

An image shooting apparatus has a detector for acquiring information needed to control the focus of a taking lens in a plurality of target areas within the shooting area, and a light emitter having a plurality of light-emitting portions for illuminating the plurality of target areas. The light-emitting portion that is located farthest away from the taking lens illuminates the target area that is located opposite to that light-emitting portion with respect to the taking lens. Moreover, the light-emitting portion located farthest away from the taking lens and the other light-emitting portions use a common light source so that light from this common light source is divided and shone onto the plurality of target areas. Furthermore, the plurality of light-emittining portions are so arranged that the optical paths of the light beams emitted therefrom cross one another.

16 Claims, 16 Drawing Sheets

IMAGE SHOOTING APPARATUS

This application is based on applications Nos. H09-194089, H09-194091, and H09-194094 filed in Japan, the content of which is hereby incorporated by reference.

BACKGROUND OF THE INVENTION

1. Field of the Invention

The present invention relates to an image shooting apparatus, and particularly to an image shooting apparatus having an auxiliary light emitting device that is used to detect focus on a low-light or low-contrast object.

2. Description of the Prior Art

Conventionally, automatic focusing (AF) has been widely used in cameras and similar apparatuses. Automatic focusing is achieved by the use of an automatic focus adjustment device that automatically adjusts focus by calculating the degree of defocus of the taking lens or by measuring the distance to the object. For example, in one type of automatic focus adjustment device, focus is adjusted by first calculating the degree to which the image of the object is out of focus (defocused) based oin the relative position or contrast of the image within a focus-detection area on the screen, and then driving the taking lens in accordance with the thus calculated degree of defocus. For a low-light object, focus detection is performed actively by illuminating the object with auxiliary light emitted from an auxiliary light source provided on the part of the camera.

Moreover, in some cases, to widen the field of view for distance measurement so as to securely catch the object to be targeted for distance measurement, a plurality of focus-detection areas are provided, a plurality of auxiliary light beams are emitted to the object, and a plurality of light-sensing devices are provided to sense the light reflected from the object. This serves to prevent shortage of reflected light that may result depending on the conditions in which the object is placed when distance measurement is performed by emitting a spot light to the object, or to prevent failure of or errors in distance measurement that may result, for example, when two persons to be photographed are standing side by side and the distance-measurement field of view, if it is relatively narrow, falls just between the two persons.

In some conventional examples, auxiliary light is emitted by simultaneously turning on a plurality of light-emitting diodes built into the camera body or flash. These light-emitting diodes, however, receive a current as low as about 200 mA even at the peak. and therefore they cannot be used for so-called low-contrast compensation as will be described later. The flash may incorporate a power source of sufficient capacity, but the use of such a power source is inadequate because, in a situation where the flash needs to be fired anyway, the object is in low-light conditions, and therefore there is no need to use high-intensity auxiliary light, that is, low-intenisity auxiliary light suffices for such a situation. In other conventional examples, the light emitted from one light-emitting diode is made into a slit-shaped beam of light through a prism so that all focus-detection areas will receive the light simultaneously. This method, however, not only necessitates development of special optical systems and special light-sensing devices, but also suffers from shortage of light.

The conventional devices and methods as described above, however, have the following disadvantages. If an auxiliary light device that uses a light source, such as light-emitting diodes (LEDs), built into the camera body is disposed too close to the main optical axis of the taking lens, the auxiliary light tends to be eclipsed by the taking lens. In particular, the part of the auxiliary light that strikes (among others) the focus-detection area that is situated opposite to the light source with respect to the main optical axis of the taking lens is most susceptible to eclipse. By contrast, if the auxiliary light device is disposed too far away from the main optical axis, the auxiliary light may be obstructed by the hand of the user of the camera. This cannot be avoided unless the camera body is made larger.

Moreover, where a plurality of beams of auxiliary light need to be emitted to a plurality of focus-detection areas, dividing the light from a single light-emitting diode that is built into a camera as an auxiliary light source leads to shortage of light. That is, it is almost essential to turn on a plurality of light-emitting diodes. In particular, where focus detection is impossible because the object is in well-lit but low-contrast conditions as when shooting a white wall, contrast needs to be enhanced (so-called low-contrast compensation) by the use of auxiliary light that is sufficiently intense relative to the illuminance of the object and that has a pattern. This, however, cannot be achieved without feeding each light-emitting diode with a current, for example, as high as about 600 mA.

When a plurality of light-emitting diodes are turned on simultaneously, they require too much current; for example, as few as two light-emitting diodes require as high a current as, for example, about 1.2 A. This is difficult to cope with considering the capacity of the power source that can be accommodated in a limited space secured for it within the camera body. Moreover, this may adversely affect the light-sensing devices and the controller. In addition, to prevent destruction of the light-emitting diodes that are fed with so high a current, it is necessary to limit the duration for which they are kept on and secure periods in which they are kept off for heat dissipation. This necessitates elaborate control of the light-emitting diodes such that they are turned on not simultaneously but successively and that their "on" and "off" periods are regulated.

On the other hand, conventionally, auxiliary light target areas are typically determined with respect to the above-mentioned focus-detection areas in such a way that the most effective illumination is achieved when a so-called standard lens is used as the taking lens. This means that, in shooting with a wide-angle lens, a recently developed zoom lens having a wide-angle region, or a similar lens mounted on the same camera, the focus-detection areas are disproportionately large with respect to the object and the auxiliary light target areas. In particular, the focus-detection areas far away from the main optical axis of the taking lens fall disproportionately far away from the main optical axis, causing off-axial auxiliary light beams to strike almost completely off their respective focus-detection areas.

For example, as shown in FIG. 17, the auxiliary light target areas are conventionally so determined as to agree with the focus-detection areas available with the standard lens, like the central, left-hand, and right-hand auxiliary light target areas 10, 12, and 13, respectively. However, when the lens is changed to a wide-angle lens, the central, left-hand, and right-hand focus-detection areas are located as indicated by 7w, 6w, and 8w, respectively, and thus, in particular, the left-hand and right-hand focus-detection areas 6w and 8w cannot be covered by the off-axial auxiliary light target areas 12 and 13 as determined in the conventional manner.

By contrast, if the auxiliary light target areas are so determined as to be entirely fit for the wide-angle lens, they are disproportionately large relative to the focus-detection areas when the standard lens is used. This reduces the illuminance of the object illuminated by the auxiliary light and thus makes the illumination range unduly short. In addition, this makes it impossible to maintain the conventional performance in cases where focus detection is impossible because the object is in well-lit but low-contrast conditions as when shooting a white wall and where contrast therefore needs to be enhanced (so-called low-contrast compensation) by the use of auxiliary light that is sufficiently intense relative to the illuminance of the object and that has a pattern.

SUMMARY OF THE INVENTION

An object of the present invention is to provide a compact image shooting apparatus equipped with an auxiliary light emitting device.

Another object of the present invention is to provide an image shooting apparatus equipped with an auxiliary light emitting device that allows auxiliary light emitted from a light source built into the image shooting apparatus itself to securely illuminate all focus-detection areas without being eclipsed by a taking lens.

Still another object of the present invention is to provide an image shooting apparatus equipped with an auxiliary light emitting device that allows auxiliary light to illuminate all predetermined focus-detection areas with sufficient intensity without burdening power and light sources with unduly heavy loads.

A further object of the present invention is to provide an image shooting apparatus equipped with an auxiliary light emitting device that offers auxiliary light target areas fit even for a wide-angle lens without sacrificing distance-measurement performance.

To achieve the above objects, according to one aspect of the present invention, an image shooting apparatus is provided with a detector for acquiring information needed to control focus of a taking lens in a plurality of target areas within a shooting area, and a light emitter having a plurality of light-emitting portions for illuminating the plurality of target areas. In addition, in this image shooting apparatus, the light-emitting portion that is located farthest away from the taking lens illuminates the target area that is located opposite to that light-emitting portion with respect to the taking lens.

According to another aspect of the present invention, an image shooting apparatus is provided with a detector for acquiring information needed to control focus of a taking lens in a plurality of target areas within a shooting area, a light emitter having a plurality of light-emitting portions for illuminating the plurality of target areas, and a controller for controlling the light emitter in such a way that only one of the light-emitting portions emits light at a time.

According to still another aspect of the present invention, an image shooting apparatus is provided with a detector for acquiring information needed to control focus of a taking lens in a plurality of target areas within a shooting area, and a light emitter having a plurality of light-emitting portions for illuminating the plurality of target areas. In addition, in this image shooting apparatus, the plurality of light-emitting portions emit light at different magnifications.

According to a further aspect of the present invention, an image shooting apparatus is provided with a detector for acquiring information needed to control focus of a taking lens in a plurality of target areas within a shooting area, and a light emitter for illuminating the plurality of target areas, the light emitter including a first light-emitting portion that emits light to a target area on an optical axis of the taking lens and also including a second and a third light-emitting portion that each emit light to a target area off the optical axis of the taking lens. In addition, in this image shooting apparatus, the second and third light-emitting portions are arranged horizontally with respect to each other within the image shooting apparatus, and the first light-emitting portion is arranged vertically with respect to the second and third light-emitting portions within the image shooting apparatus.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
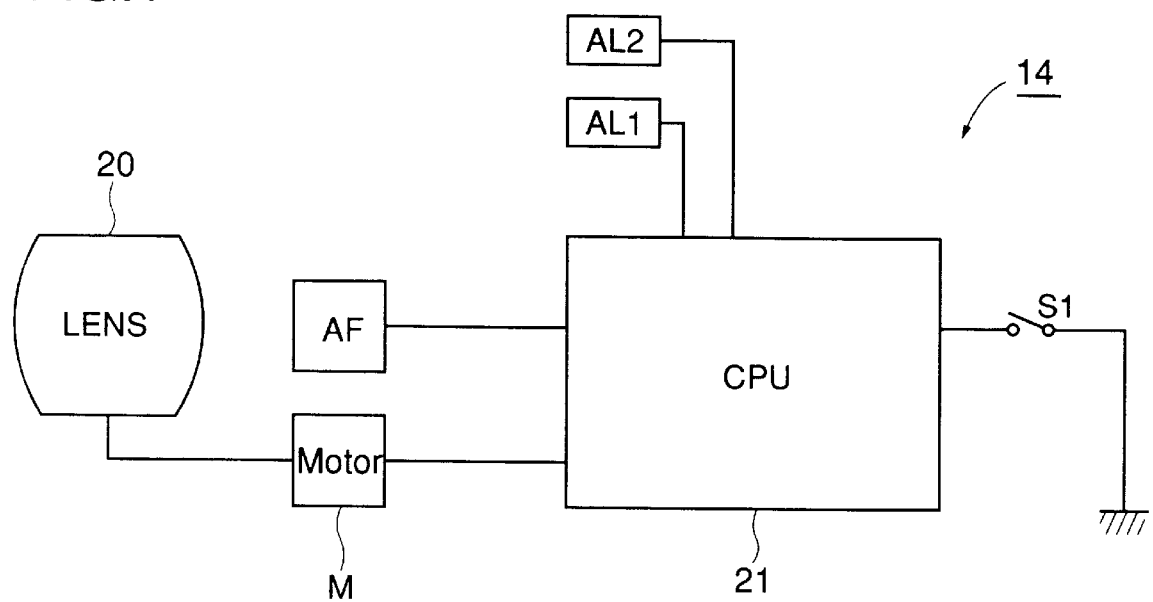
FIG. 1 is a block diagram illustrating the outline of the structure of a single-lens reflex camera embodying the present invention.

Hereinafter, embodiments of the present invention will be described with reference to the drawings. FIG. 1 is a block diagram illustrating the outline of the structure of a single-lens reflex camera embodying the present invention. In FIG. 1, S1 represents a switch that is turned on when the release button is pressed halfway in, AL1 and AL2 each represent an auxiliary light emitting device, AF represents a focus detecting device, numeral 20 represents a taking lens, M represents a motor for driving the taking lens 20, and numeral 21 represents a controller built around a microcomputer or the like.

In FIG. 1, when the release button (not shown) is pressed halfway in, causing the switch Si to be turned on, the controller 21 instructs the auxiliary light emitting device AL1 or AL2 to emit auxiliary light to and around an area on the object that is to be used as a focus-detection area so that the object will be illuminated sufficiently, and then, by sensing the light reflected from the object and returning through the taking lens 20 onto the focus detecting device AF, performs focus detection. Thereafter, in accordance with the information thus obtained, the controller 21 calculates the amount of defocus, and, by driving the motor M in accordance with the calculated amount of defocus and thereby driving the taking lens 20 accordingly, performs focus adjustment.

Figure 2:
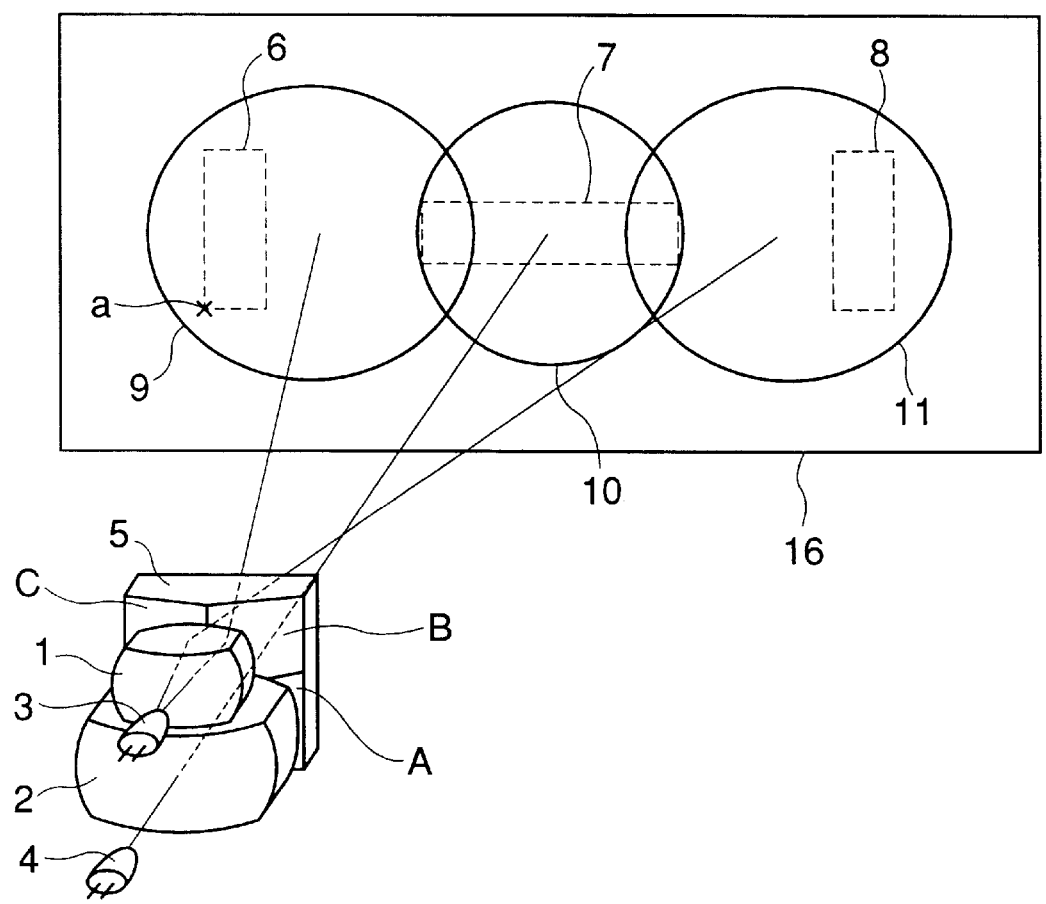
FIG. 2 is a diagram schematically illustrating the structure of the auxiliary light emitting device of the embodiment.

FIG. 2 is a diagram schematically illustrating the structure of the auxiliary light emitting device of the embodiment. In FIG. 2, numerals 1 and 2 represent auxiliary light lenses through which auxiliary light is emitted, numerals 3 and 4 represent light-emitting diodes (LEDs) that serve as the light source of the auxiliary light, numeral 5 represents a prism. The prism 5 has, on the one hand, surfaces 5B and 5C through which the light from the light-emitting diode 3 is divided and directed toward areas at both sides of the center of the image screen and, on the other hand, a surface 5A through which the light from the light-emitting diode 4 is directed toward an area at the center of the image screen, i.e. toward an area closely around the main optical axis. Here, the auxiliary light lens 1, the light-emitting diode 3, and the surfaces 5B and 5C of the prism 5, for example, are considered to constitute the above-mentioned auxiliary light emitting device AL1, and the auxiliary light lens 2, the light-emitting diode 4, and the surface 5A of the prism 5, for example, are considered to constitute the above-mentioned auxiliary light emitting device AL2.

On the other hand, numerals 6, 7, and 8 represent focus-detection areas. The focus-detection area 7 is located approximately at the center of the image screen 16, with its longer side oriented horizontally, and the focus-detection areas 6 and 8 are located on the right-hand and left-hand sides, respectively, of the center of the image screen 16, with their longer side oriented vertically. The auxiliary light that has passed through the surface 5B, which is located in the upper right-hand portion of the prism 5, is directed to the auxiliary light target area 9 that includes the focus-detection area 6 that is located on the left-hand side of the image screen 16, and the auxiliary light that has passed through the surface 5C, which is located in the upper left-hand portion of the prism 5, is directed to the auxiliary light target area 11 that includes the focus-detection area 8 that is located on the right-hand side of the image screen 16. The auxiliary light that has passed through the surface 5A, which is located in the lower portion of the prism 5, is directed to the auxiliary light target area 10 that includes the focus-detection area 7 that is located at the center of the image screen 16.

Figure 3:
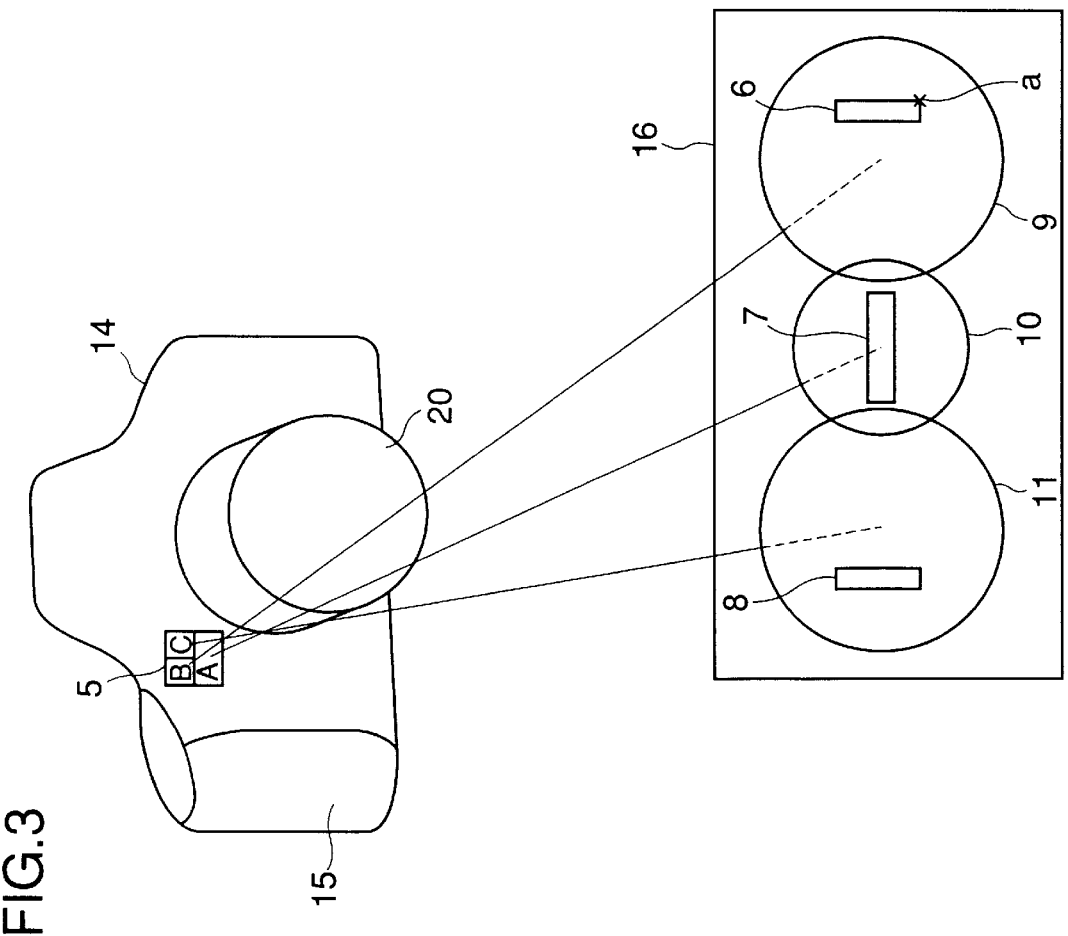
FIG. 3 is a diagram schematically illustrating the auxiliary light emitting device of FIG. 2 as seen from the object side.

FIG. 3 is a diagram schematically illustrating the structure of FIG. 2 as seen from the object side. As shown in FIG. 3, the prism 5, which is one of the components constituting the auxiliary light emitting device, is disposed, for example, on the front surface of the camera body 14, at the upper left of the taking lens 20. The other components of the auxiliary light emitting device are housed inside the camera body 14. Note that, due to the difference in the viewpoint, the surfaces 5B and 5C of the prism 5, the focus-detection areas 6 to 8, and the auxiliary light target areas 9 to 11 are shown the other way around in FIG. 3, as compared with FIG. 2.

Figure 4:
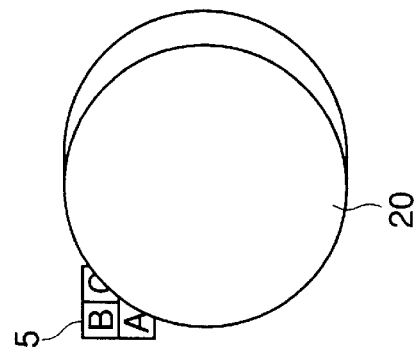
FIG. 4 is a diagram schematically illustrating the auxiliary light emitting device as seen from point α in FIG. 3.

FIG. 4 is a diagram showing the auxiliary light emitting device (prism 5) as seen from point α that is located at the lower right corner (at the lower left corner in FIG. 2) of the focus-detection area 6 that is located, as seen from the object side, in the right-hand portion of the image screen 16. As shown in FIG. 4, the auxiliary light coming from the surfaces 5A and 5C of the prism 5 is eclipsed by the taking lens 20. To avoid this, in the embodiment under discussion, the auxiliary light coming from the surface 5B is directed to the focus-detection area 6. That is, to reduce eclipse, the auxiliary light optical system, i.e. the optical system composed of the prism 5 and other components mentioned above, is divided into a plurality of optical systems, and, out of these divided optical systems, the one that is located farthest away from the main optical axis of the taking lens is made to emit auxiliary light to the focus-detection area that is located opposite thereto with respect to the main optical axis. This makes it possible to place the auxiliary light optical system as a whole as close to the main optical axis as possible, and thus eliminates the need to make the camera body larger.

One of the reason why the prism 5, and thus the auxiliary light optical system, is placed in a position as shown in FIG. 3 is that a camera body 14 typically has a grip 15 along the left-hand edge of its front surface. That is, this grip 15 serves, to a certain extent, to restrict the position in which the user places his or her right hand and thereby prevent the auxiliary light, which comes out of the prism 5 that is located on the same side as the grip 15 with respect to the main optical axis of the taking lens, from being obstructed by the right hand. If the prism 5 is located on the right of the taking lens 20, i.e. opposite to the grip with respect to the taking lens 20, there is a strong possibility that the user, in holding the camera body 14 with both hands, obstructs the auxiliary light with his or her left hand, because there is nothing to guide the left hand in position.

Moreover, although the focus-detection areas are located one on each of the left-hand and right-hand sides of the main optical axis in this embodiment, it is also possible to locate a plurality of focus-detection areas on either or both sides of the main optical axis and emit auxiliary light to part or all of those focus-detection areas.

Figure 5:
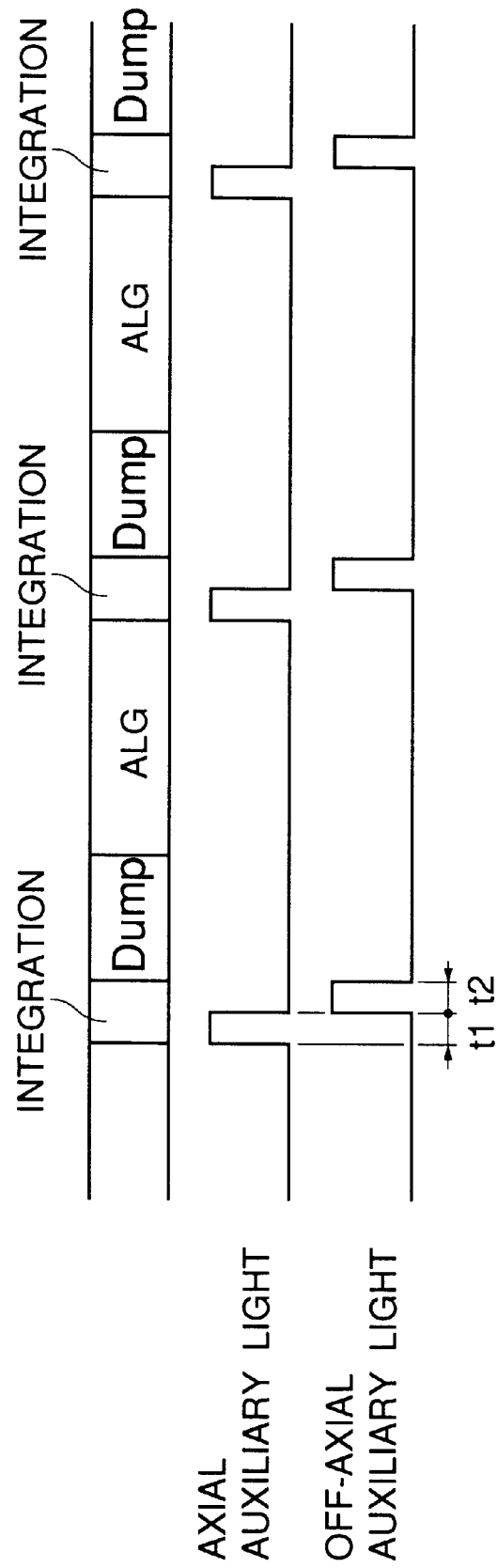
FIG. 5 is a timing chart of the auxiliary light emitting operation performed in the embodiment (when low-contrast compensation is required)

FIG. 5 illustrates the auxiliary light emitting operation performed in sufficiently well-lit but low-contrast conditions. In FIG. 5, the topmost chart illustrates the sequence of operations for focus detection. During the period for integration, in a light-sensing device (for example, a CCD, though not shown) included in the above-mentioned focus detecting device AF, a large amount of electric charge is collected at the pixels that are receiving intense light, and a small amount of electric charge is collected at the pixels that are receiving weak light (for example, by CCD integration). Next, during the dump (dumping) period, the voltage appearing in accordance with the amount of electric charge collected at each pixel is fed, as data, to the above-mentioned controller 21 (CPU). The controller 21 converts this data into digital data. Next, during the ALG (algorithm) period, based on this digital data (image data), the focus condition of the taking lens is detected and thereby the degree of defocus is determined.

As the second chart from the top shows, when the above-mentioned integration period starts, the axial auxiliary light, i.e. the auxiliary light emitted from the light-emitting diode 4 to the auxiliary light target area 10, is emitted for a period of time (auxiliary light control time) t1. Since the current that flows through the light-emitting diode 4 during this period is, for example, as high as 600 mA, the period t1 is set, for example, at 6 milliseconds so that the heat that accompanies light emission will not melt the wirebonding applied to the gold wires provided as electrodes in the light-emitting diode device.

As the third chart from the top shows, when the above-mentioned axial auxiliary light goes out, the off-axial auxiliary light, i.e. the auxiliary light emitted from the light-emitting diode 3 to the auxiliary light target areas 9 and 11, is emitted for a period of time (auxiliary light control time) t2. The period t2 is set, for example, at 6 milliseconds for the same reason as noted above in connection with the period t1. Approximately at the same time that the off-axial auxiliary light goes out, the integration period ends and the following dump period starts, The sequence of these operations are repeated as required.

Figure 6:
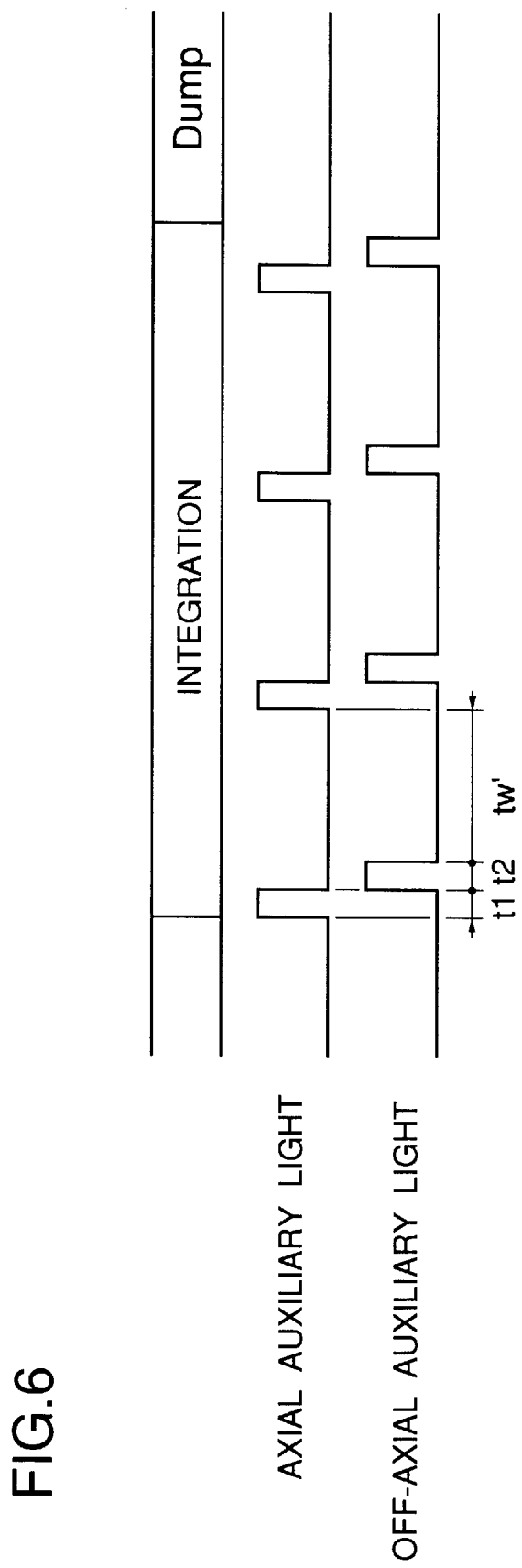
FIG. 6 is a timing chart of the auxiliary light emitting operation performed in the embodiment (when a relatively large amount of light is required)

FIG. 6 illustrates the auxiliary light emitting operation performed in low-light conditions. In this case, to secure sufficient amount of light form the object, the integration period is set to be longer. As the second chart from the top shows, when the integration period starts, the axial auxiliary light is emitted for a period of time (auxiliary light control time) t1 (for example, 6 milliseconds). As the third chart from the top shows, when the axial auxiliary light goes out, the off-axial auxiliary light is emitted for a period of time (auxiliary light control time) t2 (for example, 6 milliseconds).

To protect the light-emitting diodes, every time a light-emitting diode that has been on is turned off, it is kept off, for example, for the next 60 milliseconds for heat dissipation. As a result, in FIG. 6, if the period after the turning-off of the off-axial auxiliary light until the turning-on of the axial auxiliary light next time is represented by tw', then tw'=60−6=54 milliseconds, for example. In contrast with the case shown in FIG. 5 where low-contrast compensation is required, in the case shown in FIG. 6, where the auxiliary light does not necessarily have to be intense as long as sufficient amount of light is secured, it is also possible to keep on the light-emitting diode for a longer period at a lower current. This, however, necessitates the provision of two power supplies, one for a high current and the other for a low current, and thus leads to increased cost. Accordingly, in this embodiment, only a power supply for a high current is provided, and the turning-on of the light-emitting diode is controlled by software by the use of pulses, just in the same manner as shown in FIG. 5.

In FIG. 6, the integration period is set, for example, at 400 milliseconds, so that each type of auxiliary light can be emitted four times during this period. However, illumination may be stopped at any time as soon as sufficient amount of light is received. On the other hand, in FIG. 5, where the object is well-lit, when the period from the start of one integration period to the start of the next is too short to secure a sufficiently long period to keep off the light-emitting diode, integration is inhibited until the period to keep off the light-emitting diode has elapsed.

Figure 7:
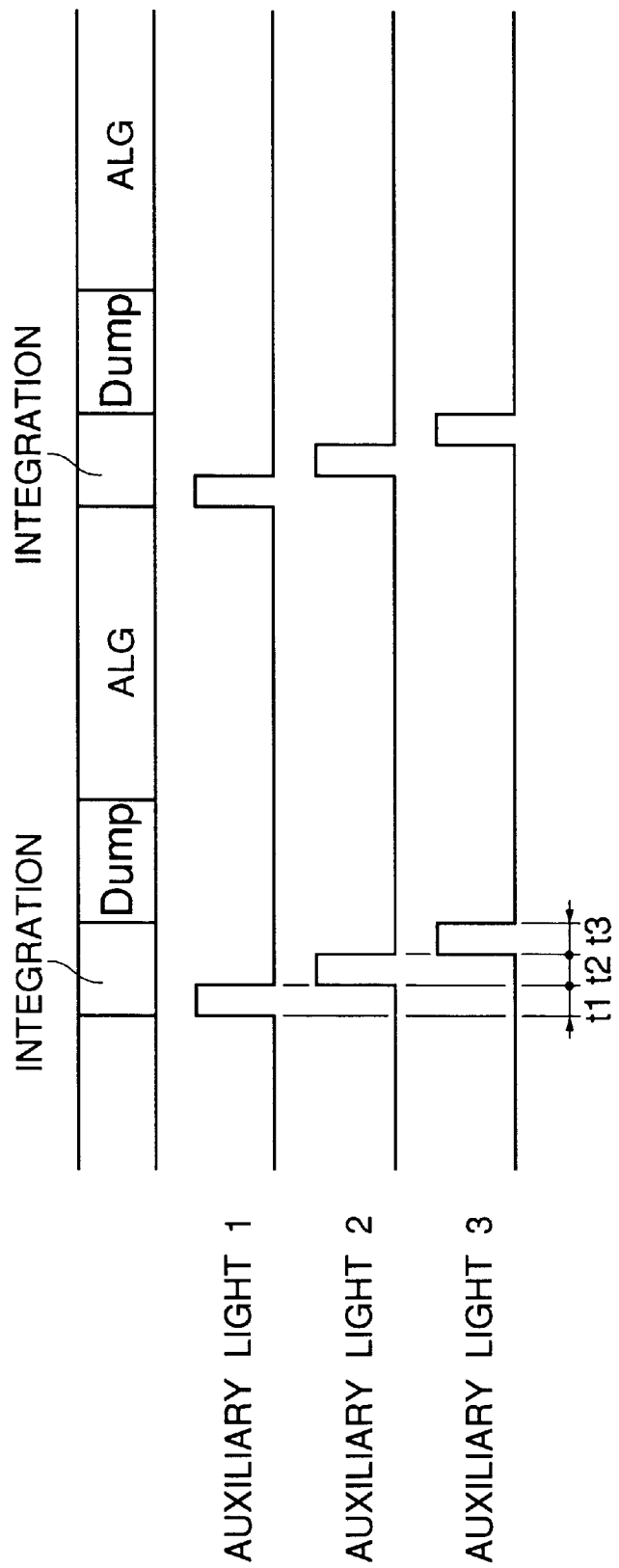
FIG. 7 is a timing chart of the auxiliary light emitting operation performed in another embodiment of the present invention (when there are three auxiliary light sources and low-contrast compensation is required)

FIG. 7 basically shows the same operation as shown in FIG. 5, except that FIG. 7 deals with a case where three light sources are provided for auxiliary light emission. As the second chart from the top shows, when the integration period starts, the auxiliary light 1 is emitted for a period of time (auxiliary light control time) t1 (for example, 6 milliseconds). Next, as the third chart from the top shows, when the auxiliary light 1 goes out, the auxiliary light 2 is emitted for a period of time (auxiliary light control time) t2 (for example, 6 milliseconds). Next, as the fourth chart from the top shows, when the auxiliary light 2 goes out, the auxiliary light 3 is emitted for a period of time (auxiliary light control time) t3 (for example, 6 milliseconds). Approximately at the same time that the auxiliary light 3 goes out, the integration period ends, and the following dump period starts.

Figure 8:
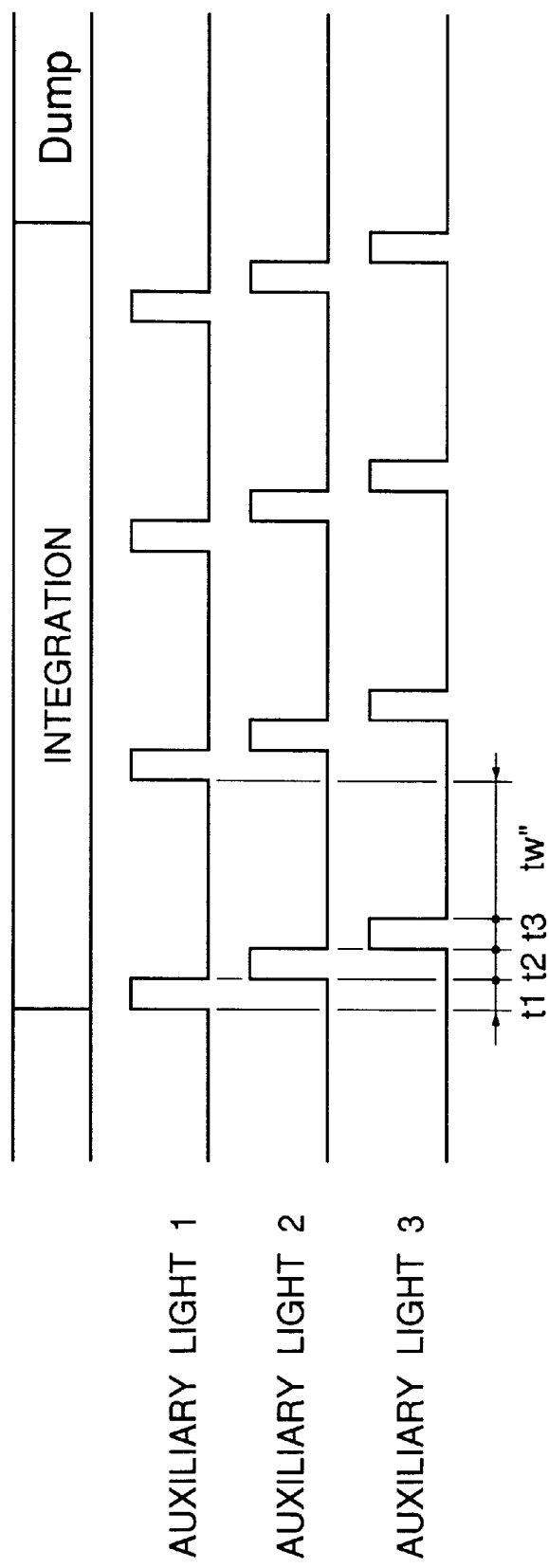
FIG. 8 is a timing chart of the auxiliary light emitting operation performed in the same embodiment as FIG. 7 (when there are three auxiliary light sources and a relatively large amount of light is required)

FIG. 8 basically shows the same operation as shown in FIG. 6, except that FIG. 8, like FIG. 7, deals with a case where three light sources are provided for auxiliary light emission. As the second chart from the top shows, when the integration period starts, the auxiliary light 1 is emitted for a period of time (auxiliary light control time) t1 (for example, 6 milliseconds). Next, as the third chart from the top shows, when the auxiliary light 1 goes out, the auxiliary light 2 is emitted for a period of time (auxiliary light control time) t2 (for example, 6 milliseconds). Next, as the fourth chart from the top shows when the auxiliary light 2 goes out, the auxiliary light 3 is emitted for a period of time (auxiliary light control time) t3 (for example, 6 milliseconds).

To protect the light-emitting diodes, every time a light-emitting diode that has been on is turned off, it is kept off, for example, for the next 60 milliseconds for heat dissipation just as described previously. As a result, in FIG. 8, if the period after the turning-off of the auxiliary light 3 until the turning-on of the auxiliary light 1 next time is represented by tw", then tw"=60−6−6=48 milliseconds, for example.

Figure 11:
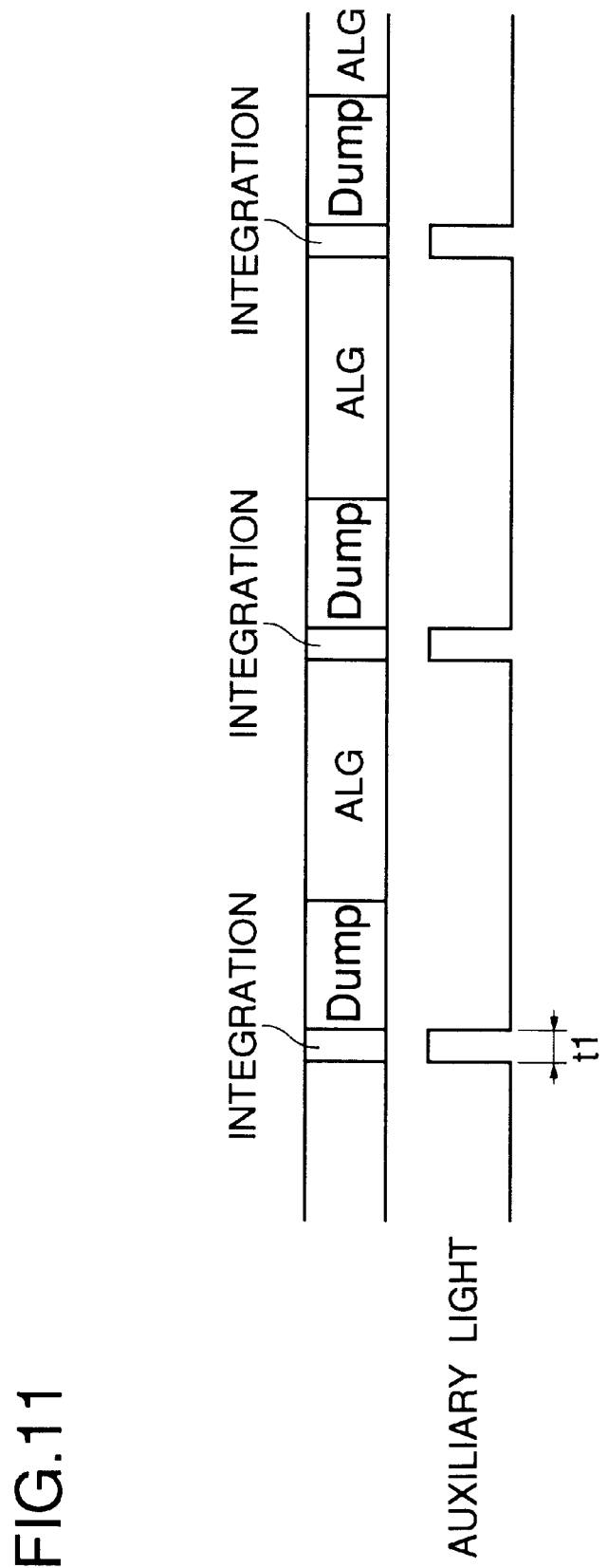
FIG. 11 is a flow chart illustrating a conventional example in which only one auxiliary light source is used (when low-contrast compensation is required)
Figure 12:
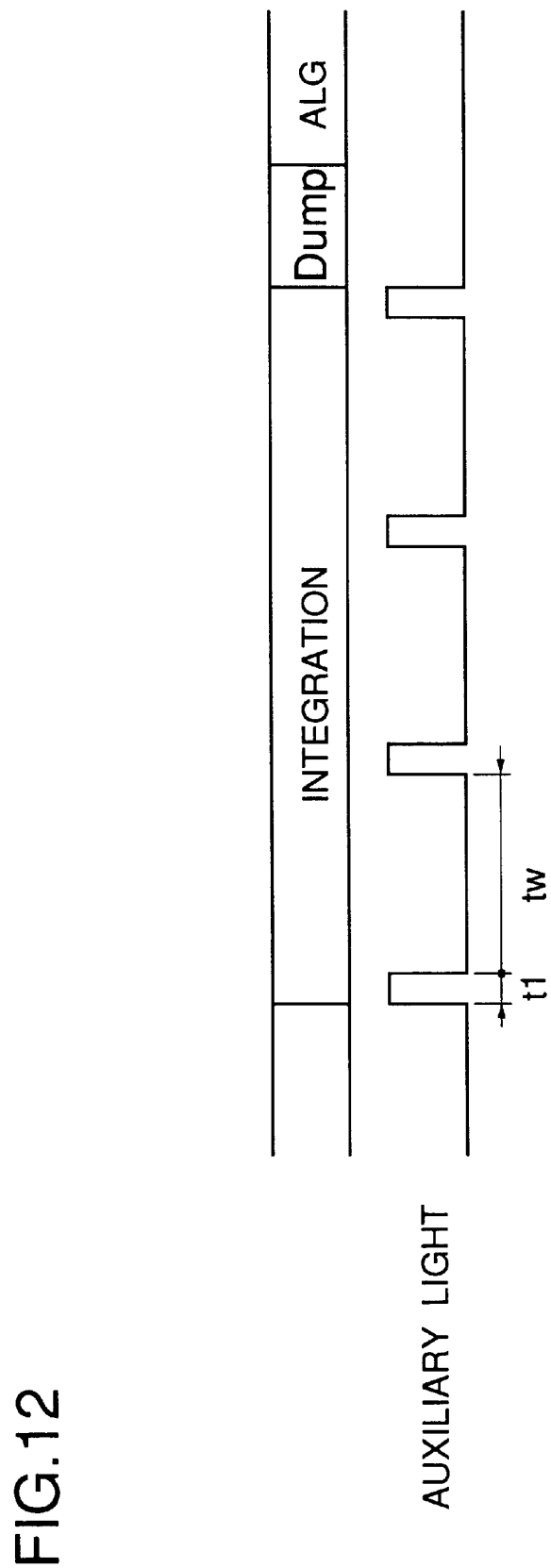
FIG. 12 is a flow chart illustrating the conventional example in which only one auxiliary light source is used (when a relatively large amount of light is required)

FIGS. 11 and 12 are timing charts illustrating the auxiliary light emitting operation performed during focus detection in a conventional structure where there is only one light source for auxiliary light emission, with FIG. 11 showing the case where low-contrast compensation is required and FIG. 12 showing the case where a relatively large amount of light is required. In these cases, there is no need to synchronize light emission between two or more light sources. In FIG. 11, as the second chart from the top shows, when the integration period starts, auxiliary light is emitted for a period of time (auxiliary light control time) t1 (for example, 6 milliseconds). Approximately at the same time that the auxiliary light goes out, the integration period ends, and the following dump period starts.

On the other hand, in FIG. 12, as the second chart from the top shows, when the integration period starts, auxiliary light is emitted for a period of time (auxiliary light control time) t1 (for example, 6 milliseconds). To protect the light-emitting diodes, every time a light-emitting diode that has been on is turned off, it is kept off, for example, for the next 60 milliseconds for heat dissipation just as described previously. As a result, in FIG. 12, if the period after the turninig-off of the auxiliary light until the turning-on of the auxiliary light next time is represented by tw, then tw=60 milliseconds, for example.

Figure 9:
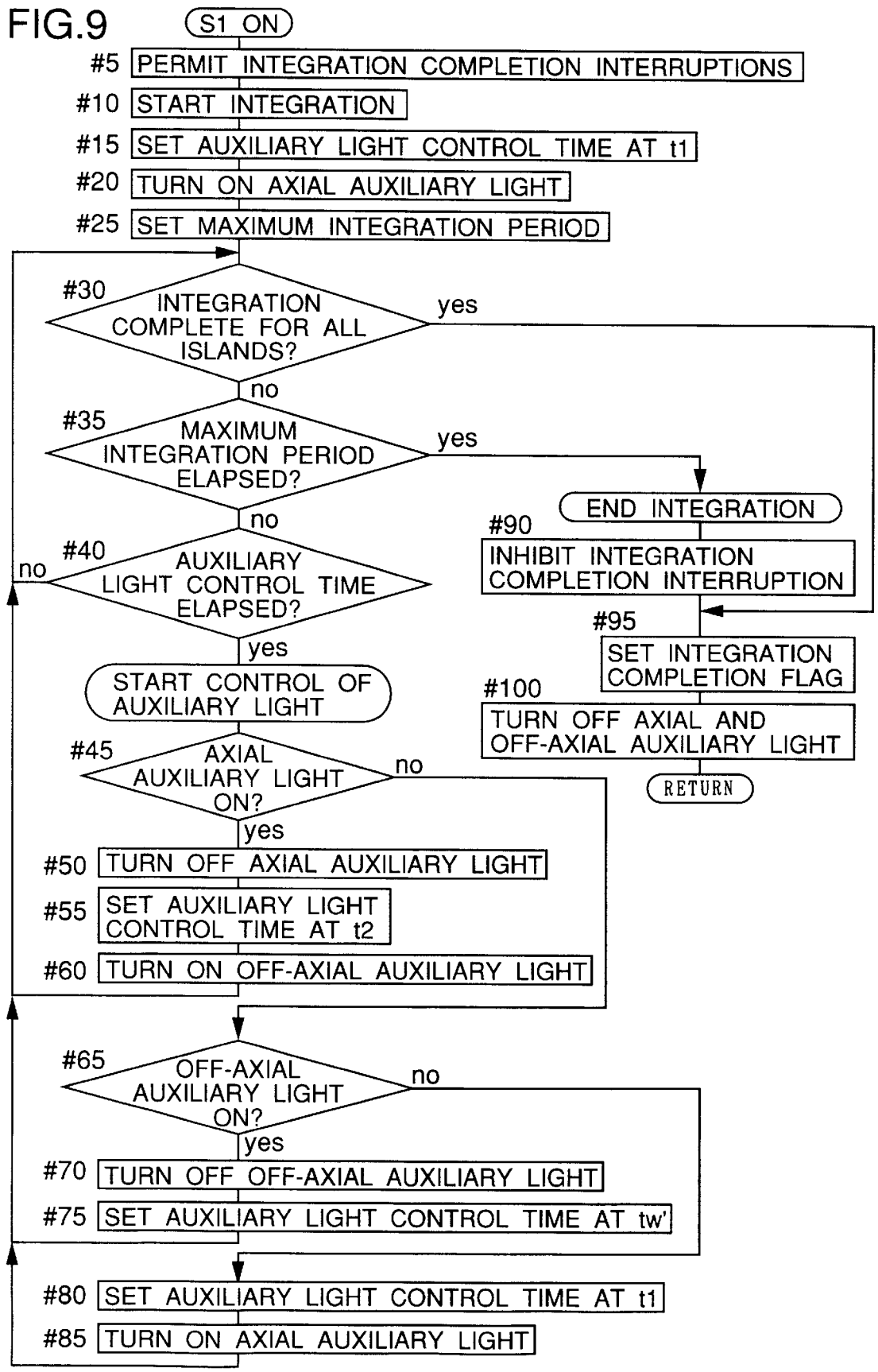
FIG. 9 is a flow chart illustrating the auxiliary light emitting operation performed in the embodiment.
Figure 10:
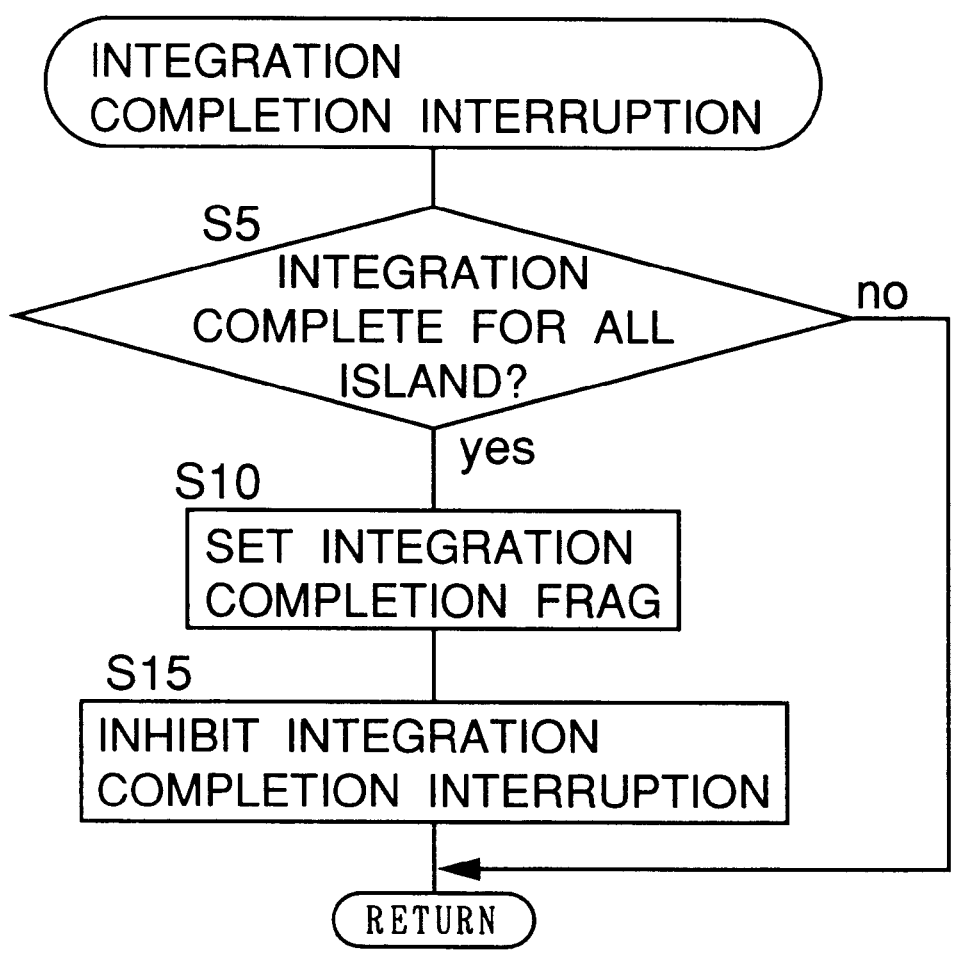
FIG. 10 is a flow chart illustrating the auxiliary light emitting operation performed in the embodiment.

FIGS. 9 and 10 are flow charts illustrating the auxiliary light emitting operation performed in the embodiment under discussion. FIG. 9 shows the main flow of the operation. As shown in FIG. 9, when the release button (not shown) of the camera body is pressed halfway in, causing the switch S1 shown in FIG. 1 to be turned on, then first, in step #5, permission is given to integration completion interruptions. This is done to allow, in advance, the controller 21 to stop integration when it receives an interruption indicating the completion of integration from the light-sensing device (for example, CCD) included in the focus detecting device AF shown in FIG. 1.

Next, in step #10, integration is started. Then, in step #15, the auxiliary light control time is set to be equal to t1 (for example, 6 milliseconds). Then, in step #20, axial auxiliary light is emitted. Thereafter, in step #25, the maximum length of the integration period is set in accordance with the choice made in advance as to whether low-contrast compensation is required as shown in FIG. 5 or a relatively large amount of light is required as shown in FIG. 6. Which pattern to choose is determined separately in a predetermined way (of which the description will be omitted).

Next, in step #30, whether integration is complete for all islands, i.e. for all of the focus-detection areas, or not is checked. If not, then, in step #35, whether the maximum length of the integration period has elapsed or not is checked. If not, then, in step #40, whether the auxiliary light control time t1 has elapsed or not is checked. If not, the operation sequence returns to step #30 to repeat the above checking.

If, in step #40, the auxiliary light control time t1 is found to have elapsed, this means the end of the period for axial auxiliary light emission, and thus control of the auxiliary light is started. Then, in step #45, whether the axial auxiliary light is on or not is checked, and then, since it is on at this time, in step #50, the axial auxiliary light is turned off. Then, in step #55, the auxiliary light control time is set to be equal to t2 (for example, 6 milliseconds). Then, in step #60, off-axial auxiliary light is turned on. Thereafter, the operation sequence returns to step #30 to repeat the above checking.

If, in step #40, the auxiliary light control time t2 is found to have elapsed, control of the auxiliary light is started. Then, in step #45, whether the axial auxiliary light is on or not is checked, and then, since it is always off at this time, in step #65, whether the off-axial auxiliary light is on or not is checked. Since it is on at this time, then, in step #70, the off-axial auxiliary light is turned off. Then, in step #75, the auxiliary light control time is set to be equal to tw' (for example, 54 milliseconds). Thereafter, the operation sequence returns to step #30 to repeat the above checking.

In the sequence of operations described above, if, in step #35, the maximum length of the integration period is found to have elapsed, it means that, as shown in FIG. 5, the maximum length of the integration period has elapsed before the end of the auxiliary light control time tw'. In that case, operations for ending integration are started, and then, in step #90, integration completion interruptions are inhibited. This is to prevent an integration completion interruption received in the middle of integration from causing errors in the processing performed by the controller 21. Thereafter, in step #95, the integration completion flag is set, and then, in step #100, both axial and off-axial auxiliary light is turned off. This is done just in case integration is complete in the middle of auxiliary light emission.

On the other hand, in the above-described sequence of operations, if, in step #35, the maximum length of the integration time is found not to have elapsed, then, in step #40, if the auxiliary light control time (tw') has elapsed, control of the auxiliary light is started. Thereafter, in step #45, whether the axial auxiliary light is on or not is checked, and, since it is always off at this time, the operation sequence proceeds to step #65. Then, in step #65, whether the off-axial auxiliary light is on or not is checked, and, since it is always off at this time, the operation sequence proceeds to step #80.

In step #80, the auxiliary light control time is set to be equal to t1. Then, in step #85, axial auxiliary light is turned on. Thereafter, back in step #30, the above checking is repeated. As a result, as shown in FIG. 6, the axial auxiliary light is emitted for the second time. Thereafter, in the same manner as described above, the turning-on and turning-off of the axial and off-axial auxiliary light are repeated until a sufficient amount of auxiliary light has been emitted. Thereafter, when, in step #30, integration is complete for all islands, then, in step #95, the same sequence of operations is repeated. Alternatively, if, in step #35, the maximum length of the integration time is found to have elapsed, operations for ending integration is started, and the same sequence of operations is repeated.

FIG. 10 illustrates the routine performed when an integration completion interruption occurs while integration completion interruptions are permitted. In step S5, whether integration is complete for all islands or not is checked, and, if not, an interruption is issued anew. That is, every time integration for one island is complete, an interruption is issued. If, in step S5, integration is found to be complete for all islands, then, in step S10, the integration completion flag is set, and then, in step S15, integration completion interruptions are inhibited.

Figure 13:
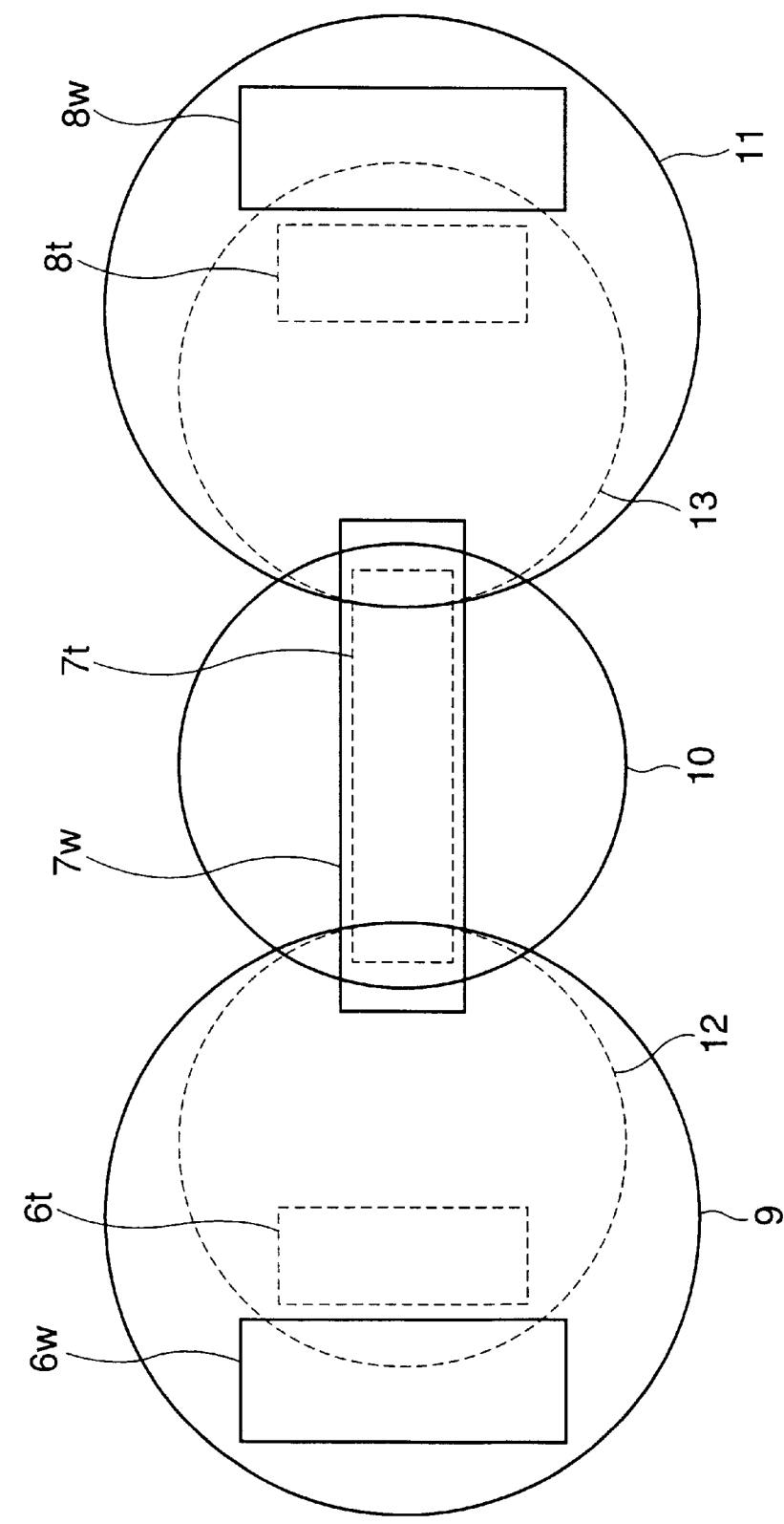
FIG. 13 is a diagram illustrating the relationship between the auxiliary light target areas and the focus-detection areas.

FIG. 13 illustrates the relationship between the auxiliary light target areas and the focus-detection areas in the embodiment under discussion. In this figure, broken lines indicate the focus-detection areas and the auxiliary light target areas corresponding thereto as observed when a so-called standard lens (for example, having a focal length of 50 mm) is used as the taking lens; solid lines indicate the focus-detection areas and the auxiliary light target areas corresponding thereto as observed when a so-called wide-angle lens (for example, having a focal length of 28 mm) is used as the taking lens. Note however that, for the axial auxiliary light that is emitted to an area around the main optical axis of the taking lens, there is only one auxiliary light target area 10 at the center, as in a conventional structure.

As shown in FIG. 13, when a standard lens is used, the focus-detection areas are located at the center as indicated by 7t and on the left-hand and right-hand sides thereof as indicated by 6t and 8t. The corresponding auxiliary light target areas 10, 12, and 13 are conventionally so located that the central one 10 completely encloses the central focus-detection area 7t in its central portion and the left-hand and right-hand ones 12 and 13 enclose the left-hand and right-hand focus-detection areas 6t and 8t in their left-hand and right-hand portions, respectively.

Accordingly, in this embodiment, the left-hand and right-hand off-axial auxiliary light target areas are extended as indicated by 9 and 11 so that they enclose the corresponding focus-detection areas 6w and 8w in their left-hand and right-hand portions, respectively. However, as indicated by 10, as the axial auxiliary light target area, the same area as in a conventional structure is used to maintain the illuminance of the object illuminated by the auxiliary light and thus the illumination range as obtained in the conventional structure (in this embodiment, an illumination range of about 15 m is achieved). This makes it possible to maintain, at least for the axial auxiliary light, the strength of the auxiliary light necessary to achieve low-contrast compensation, without sacrificing the conventionally obtained performance. That is, axial and off-axial auxiliary light is emitted at different magnifications from the light sources to the object.

In this embodiment, the optical system for axial auxiliary light magnifies the light from the light source at a magnification of approximately 250×, and the optical system for off-axial auxiliary light magnifies at a magnification slightly lower than 350×. Thus, the ratio of the magnification of the off-axial auxiliary light optical system to that of the axial auxiliary light optical system is approximately 1.4. The ratio, however, does not have to be limited to any specific value. When a telephoto lens, or a zoom lens set at its telephoto end, is used as the taking lens, the focus-detection areas are narrower and closer to the main optical system of the taking lens than they are in FIG. 13, and therefore they never extend out of the corresponding auxiliary light target areas.

Figure 14:
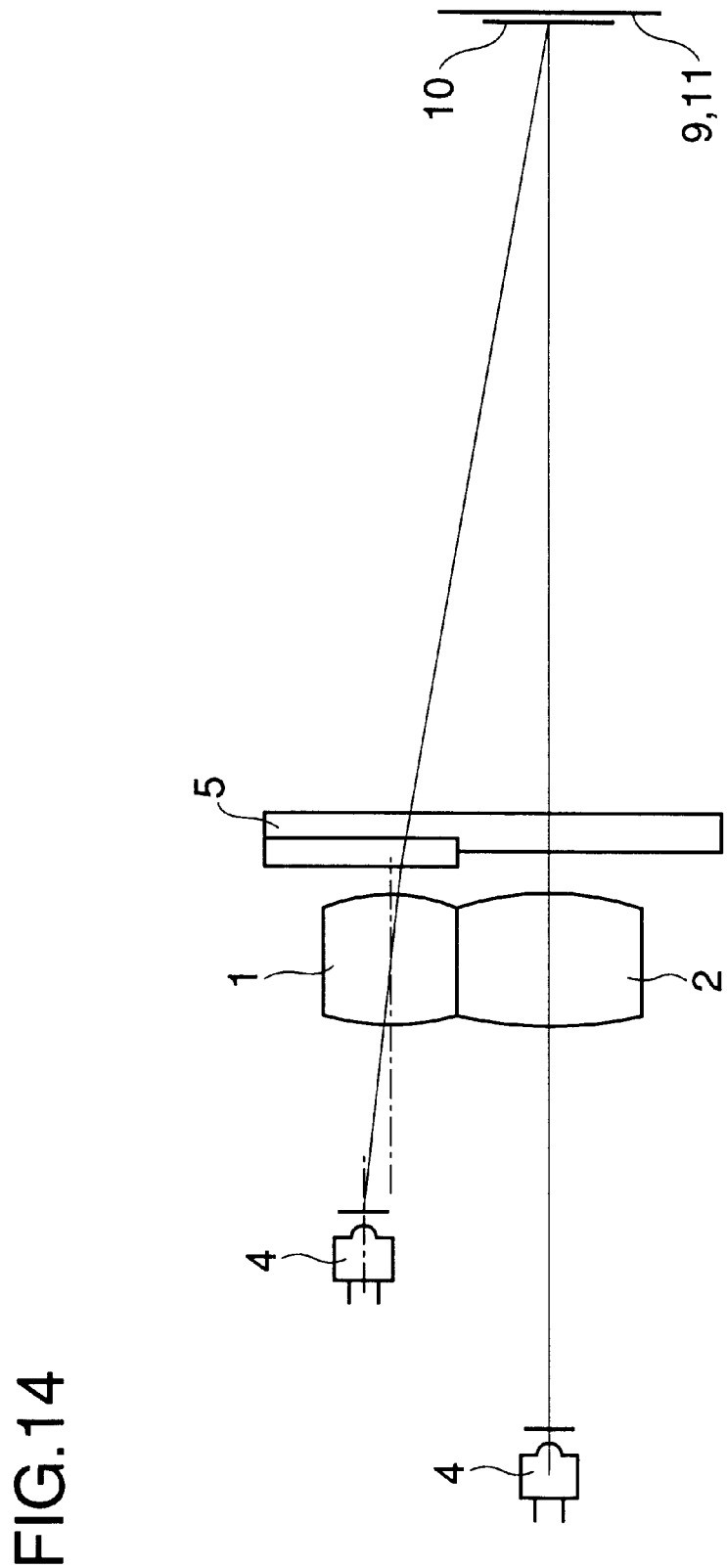
FIG. 14 is a diagram illustrating the optical path of the auxiliary light emitting device of the embodiment as seen from a side.

FIG. 14 shows the optical path of the auxiliary light emitting device of this embodiment as seen from a side. To set the magnification for off-axial auxiliary light to be higher than that for axial auxiliary light, and thereby to widen the auxiliary light target areas, as shown in FIG. 14, the distance between the light-emitting diode 3 for off-axial auxiliary light and the auxiliary light lens 1 is set to be shorter than the distance between the light-emitting diode 4 for axial auxiliary light and the auxiliary light lens 2. Moreover to simplify the structure of the optical system, the auxiliary light lenses 1 and 2 are formed in one unit.

Figure 15:
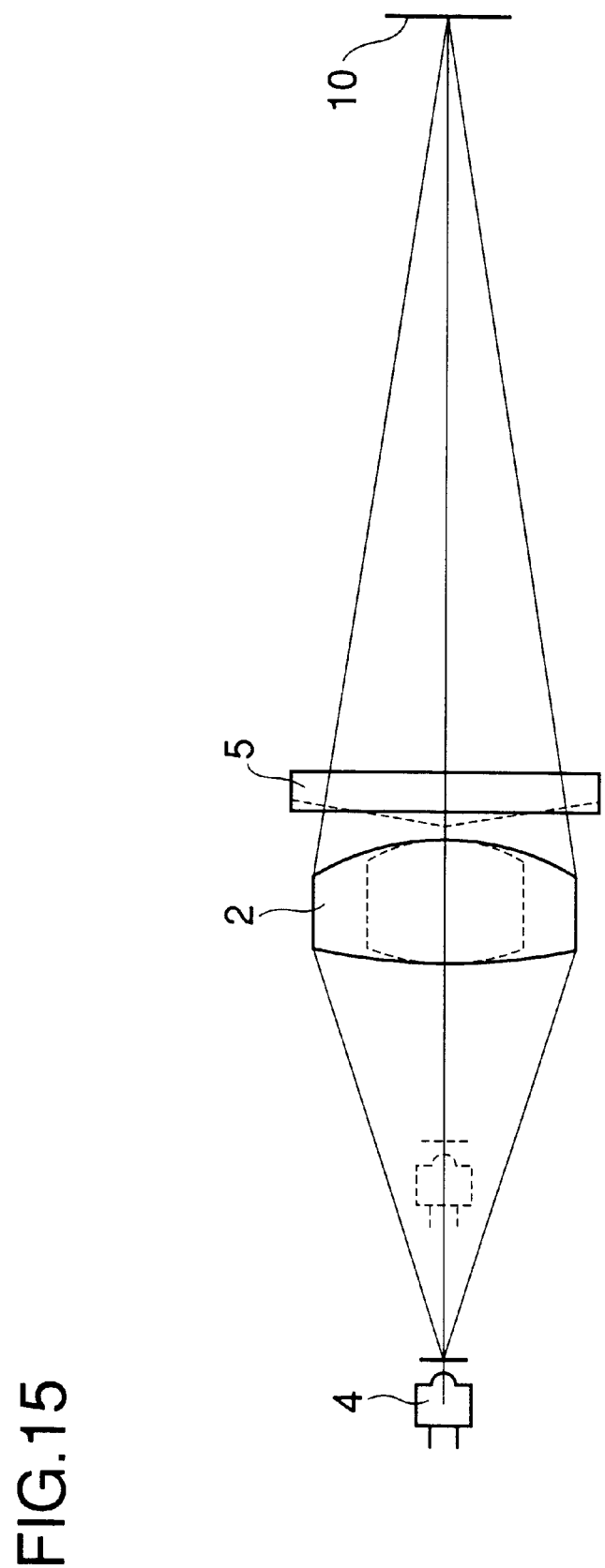
FIG. 15 is a diagram illustrating the optical path of the auxiliary light emitting device of the embodiment as seen from below.

FIG. 15 shows the optical path of the auxiliary light emitting device of this embodiment as seen from below. As shown in FIG. 15, the auxiliary light emitted form the light-emitting diode 4 is magnified by the auxiliary light lens 2, and is then passed through the prism 5 and projected onto the auxiliary light target area 10 at the center of the object. This area is, as described above, as wide as in a conventional structure.

Figure 16:
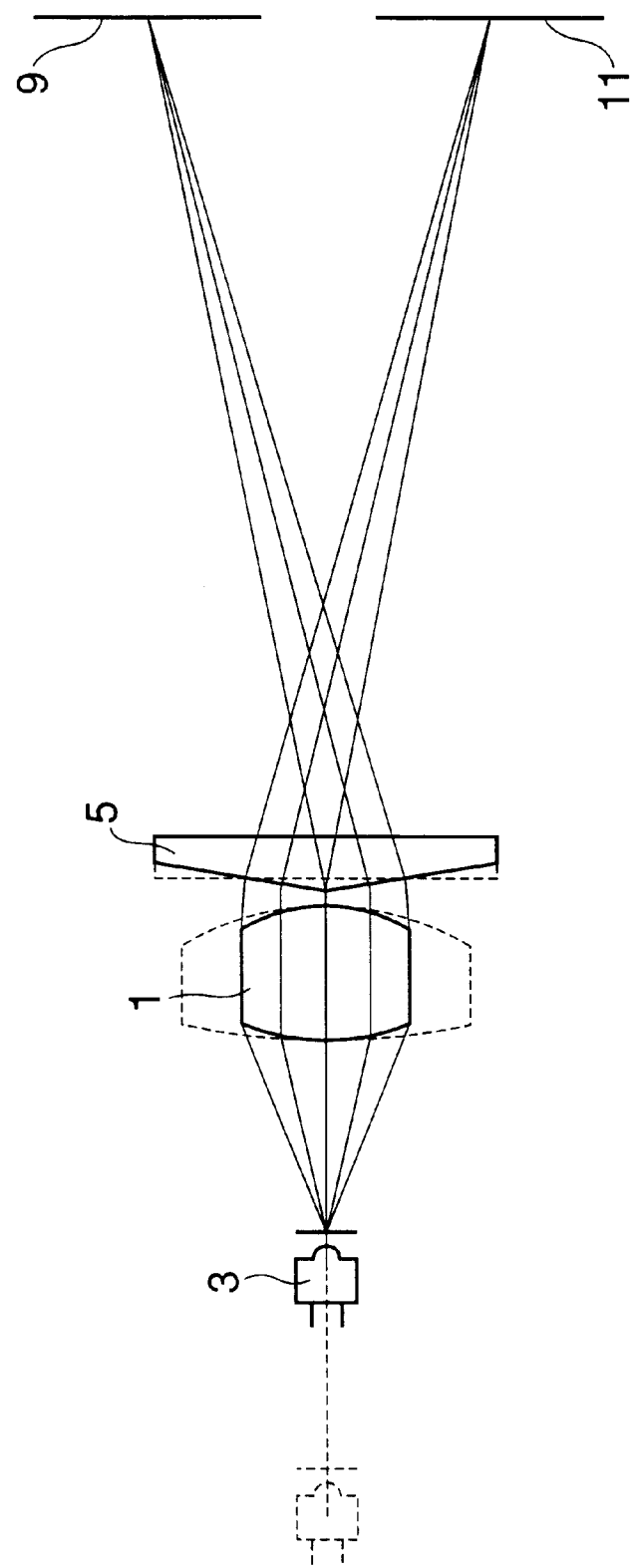
FIG. 16 is a diagram illustrating the optical path of the auxiliary light emitting device of the embodiment as seen from above.
Figure 17:
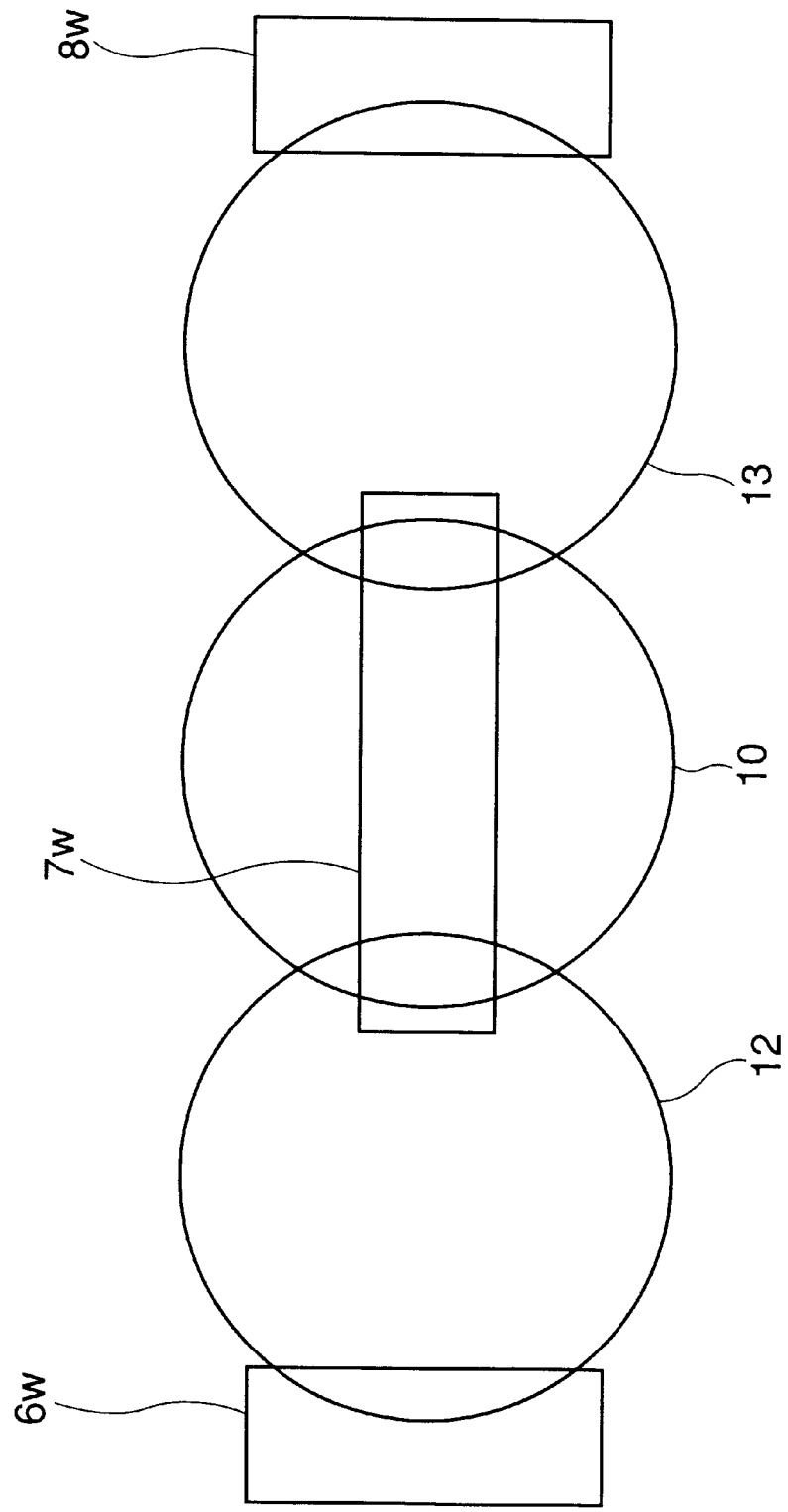
FIG. 17 is a diagram illustrating the relationship, as observed conventionally, between the auxiliary light target areas and the focus-detection areas available when a wide-angle lens is used.

FIG. 16 shows the optical path of the auxiliary light emitting device of this embodiment as seen from above. As shown in FIG. 16. the auxiliary light emitted form the light-emitting diode 3 is magnified by the auxiliary light lens 1, and is then divided by the prism 5 leftward and rightward and projected onto the auxiliary light target areas 9 and 11 on the object. These areas are, as described above, larger than in a conventional structure.

What is claimed is:

1. An image shooting apparatus comprising:
 a detector for acquiring information needed to control focus of a taking lens in a plurality of target areas within a shooting area; and
 a light emitter having a plurality of light-emitting portions for illuminating the plurality of target areas,
 wherein the light-emitting portion that is located farthest away from the taking lens illuminates the target area that is located opposite to that light-emitting portion with respect to the taking lens.

2. An image shooting apparatus as claimed in claim 1, wherein the light-emitting portion located farthest away from the taking lens and at least one other light-emitting portion use a common light source so that light from this common light source is divided and shone onto the plurality of target areas.

3. An image shooting apparatus as claimed in claim 1, wherein the plurality of light-emitting portions are so arranged that optical paths of light beams emitted therefrom cross one another before reflection by an object.

4. An image shooting apparatus comprising:
 a detector for acquiring information needed to control focus of a taking lens in a plurality of target areas within a shooting area;
 a light emitter having a plurality of light-emitting portions for illuminating the plurality of target areas; and
 a controller for controlling the light emitter in such a way that only one of the light-emitting portions emits light at a time and within a period in which the light-emitting portions are so controlled as to emit light one after another repeatedly, providing a sub-period in which none of the light-emitting portions emits light.

5. An image shooting apparatus as claimed in claim 4, wherein each of the light-emitting portions is allowed to emit light for a limited period.

6. An image shooting apparatus as claimed in claim 4, wherein, when the light emitter is made to emit light repeatedly, it is made to emit light at predetermined intervals.

7. An image shooting apparatus as claimed in claim 6, wherein, after emission of light, the light emitter is kept off for a predetermined period.

8. An image shooting apparatus as claimed in claim 4, wherein the plurality of light-emitting portions include a first light-emitting portion that emits light to a target area that is located on an optical axis of the taking lens and a second light-emitting portion that emits light to a target area that is located off the optical axis of the taking lens.

9. An image shooting apparatus as claimed in claim 8, wherein the controller first keeps the first light-emitting portion active for a predetermined period and thereafter keeps the second light-emitting portion active for a predetermined period.

10. An image shooting apparatus comprising:
 a detector for acquiring information needed to control focus of a taking lens in a plurality of target areas within a shooting area; and
 a light emitter having a plurality of light-emitting portions for illuminating the plurality of target areas,
 wherein the plurality of light-emitting portions emit light at different magnifications.

11. An image shooting apparatus as claimed in claim 10, wherein the plurality of light-emitting portions include a first light-emitting portion that emits light to a target area that is located on an optical axis of the taking lens and a second light-emitting portion that emits light to a target area that is located off the optical axis of the taking lens.

12. An image shooting apparatus as claimed in claim 11, wherein the second light-emitting portion emits light at a higher magnification than the first light-emitting portion.

13. An image shooting apparatus as claimed in claim 11, wherein the first and second light-emitting portions each have a light source and a light-emitting lens, and the light-emitting lens is disposed closer to the light source in the second light-emitting portion than in the first light-emitting portion.

14. An image shooting apparatus as claimed in claim 10, wherein the light emitter has a light source and a light-emitting lens.

15. An image shooting apparatus comprising:
 a detector for acquiring information needed to control focus of a taking lens in a plurality of target areas within a shooting area; and a light emitter for illuminating the plurality of target areas, the light emitter including a first light-emitting portion that emits light to a target area on an optical axis of the taking lens and also including a second and a third light-emitting portion that each emit light to a target area off the optical axis of the taking lens, wherein the second and third light-emitting portions are arranged horizontally with respect to each other within the image shooting apparatus, and the first light-emitting portion is arranged vertically with respect to the second and third light-emitting portions within the image shooting apparatus.

16. An image shooting apparatus as claimed in claim 15, wherein the second and third light-emitting portions use a common light source.

\* \* \* \* \*